US011951762B2

(12) United States Patent
Ovvadias

(10) Patent No.: US 11,951,762 B2
(45) Date of Patent: Apr. 9, 2024

(54) WRITING INSTRUMENT AND METHOD THEREOF

(71) Applicant: BIC Violex Single Member S.A., Anoixi (GR)

(72) Inventor: Nikolaos Ovvadias, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/187,412

(22) Filed: Mar. 21, 2023

(65) Prior Publication Data

US 2023/0302843 A1 Sep. 28, 2023

(30) Foreign Application Priority Data

Mar. 23, 2022 (EP) .................................... 22163705

(51) Int. Cl.
*B43K 24/04* (2006.01)
*B43K 24/02* (2006.01)

(52) U.S. Cl.
CPC ............ *B43K 24/04* (2013.01); *B43K 24/023* (2013.01); *B43K 24/026* (2013.01)

(58) Field of Classification Search
CPC .... B43K 24/04; B43K 24/023; B43K 24/026; B43K 24/00; B43K 24/02; B43K 24/08; B43K 24/03
USPC .................................................. 401/115, 117
See application file for complete search history.

(56) References Cited

U.S. PATENT DOCUMENTS 1,595,150 A 8/1926 Greening
5,048,991 A 9/1991 Guo
5,971,644 A 10/1999 Kageyama et al.
7,726,894 B2 6/2010 Yoon
8,079,767 B2 12/2011 Rolion et al.
(Continued)

FOREIGN PATENT DOCUMENTS

CN 201544626 U 8/2010
CN 201833708 U 5/2011
(Continued)

OTHER PUBLICATIONS

Extended European Search Report issued in European Application No. 22163705.1 dated Aug. 9, 2022 (9 pages).
(Continued)

*Primary Examiner* — David J Walczak
(74) *Attorney, Agent, or Firm* — Bookoff McAndrews, PLLC

(57) ABSTRACT

A writing instrument extending between a first end and a second end, the writing instrument including a writing element, a first housing member extending between the first end and the second end and oriented about at least a portion of the writing element, and a second housing member extending between the first end and the second end and oriented about at least a portion of the first housing member, the second housing member being configured to move relative to the first housing member, between a first relative position and a second relative position, and at least a portion of the second housing member being configured to move radially with respect to the first housing member, wherein the relative movement of the second housing member automatically transitions the writing instrument from a writing state toward a non-writing state.

18 Claims, 9 Drawing Sheets

(56) References Cited

U.S. PATENT DOCUMENTS

| | | | | |
|---|---|---|---|---|
| 8,231,296 | B2 | 7/2012 | Rolion et al. | |
| 8,641,308 | B2 * | 2/2014 | Peyton .................. | B43K 23/12 401/116 |
| 9,539,848 | B2 | 1/2017 | Bez | |
| 2005/0078999 | A1 | 4/2005 | Kato | |
| 2009/0136283 | A1 | 5/2009 | Diamond | |
| 2009/0232581 | A1 | 9/2009 | Tong | |

FOREIGN PATENT DOCUMENTS

| | | | |
|---|---|---|---|
| CN | 202046039 | U | 11/2011 |
| CN | 203210927 | U | 9/2013 |
| CN | 203818812 | U | 9/2014 |
| CN | 103754020 | B | 8/2015 |
| CN | 106427303 | A | 2/2017 |
| CN | 106739658 | B | 4/2018 |
| CN | 110202978 | A | 9/2019 |
| CN | 110370841 | A | 10/2019 |
| CN | 210680172 | U | 6/2020 |
| CN | 212332235 | U | 1/2021 |
| CN | 110356144 | B | 2/2021 |
| CN | 113212035 | A | 8/2021 |
| DE | 3214706 | A1 | 12/1982 |
| DE | 10116655 | A1 | 10/2002 |
| EP | 0402558 | A1 | 12/1990 |
| EP | 1329338 | A2 | 7/2003 |
| ES | 135924 | U | 6/1968 |
| JP | 3935913 | B2 | 6/2007 |
| JP | 2019130806 | A | 8/2019 |
| JP | 2021098346 | A | 7/2021 |
| KR | 100449098 | B1 | 9/2004 |
| WO | 2019023766 | A1 | 2/2019 |

OTHER PUBLICATIONS

Karlberg et al., Kickstarter, PBC © 2023, Peek A Boo Markers, https://www.kickstarter.com/projects/1822990837/peek- a-boo-markers (12 pages).

M-W3452, IASpromotes.com, © Copyright 1994-2023, https://www.iaspromotes.com/2606-m-w3452-10570091-promotional-items-pens-pencils-&-writing-instruments-ballpoint-pens.htm (2 pages).

* cited by examiner

[Fig.1]
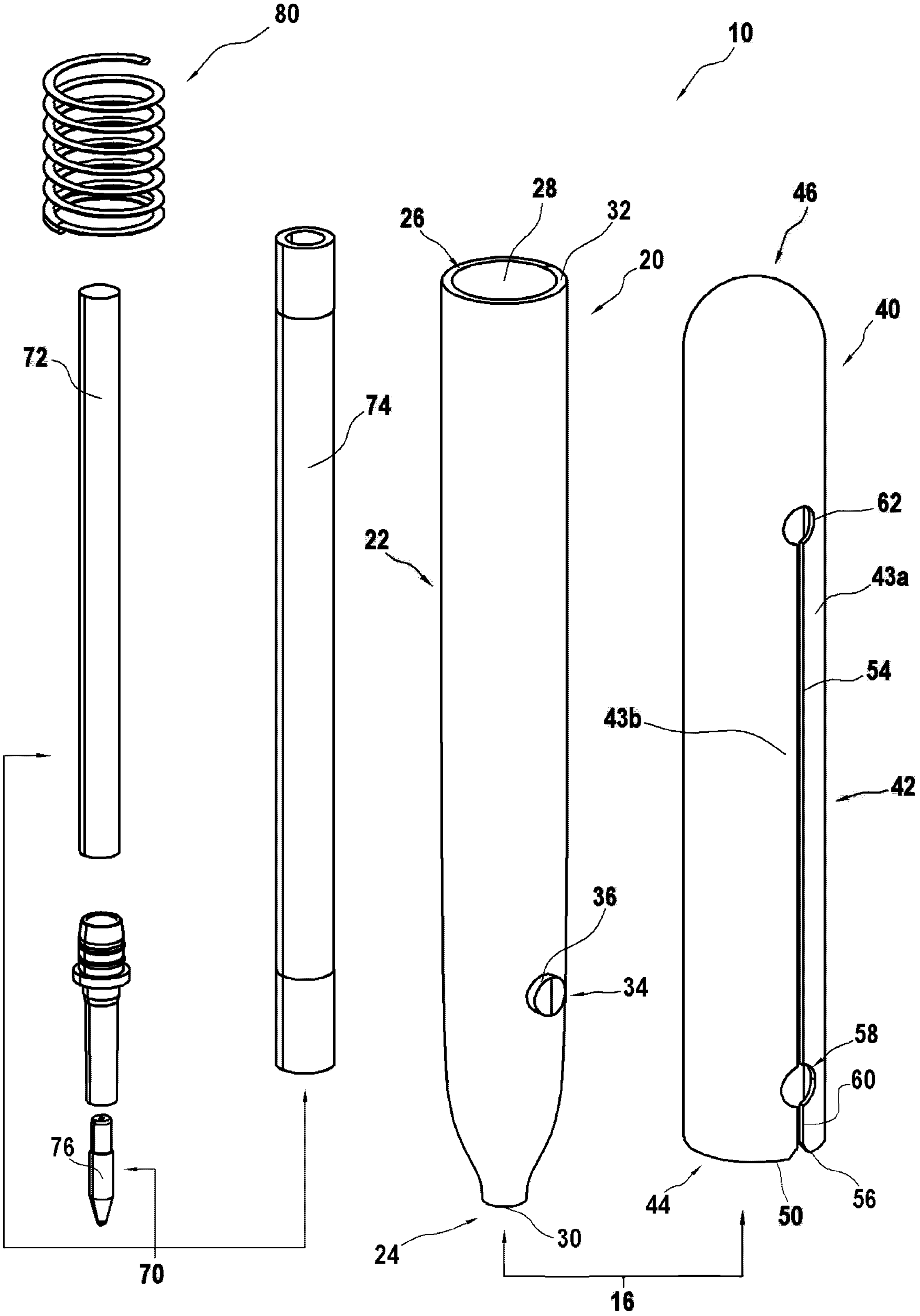

[Fig.2]
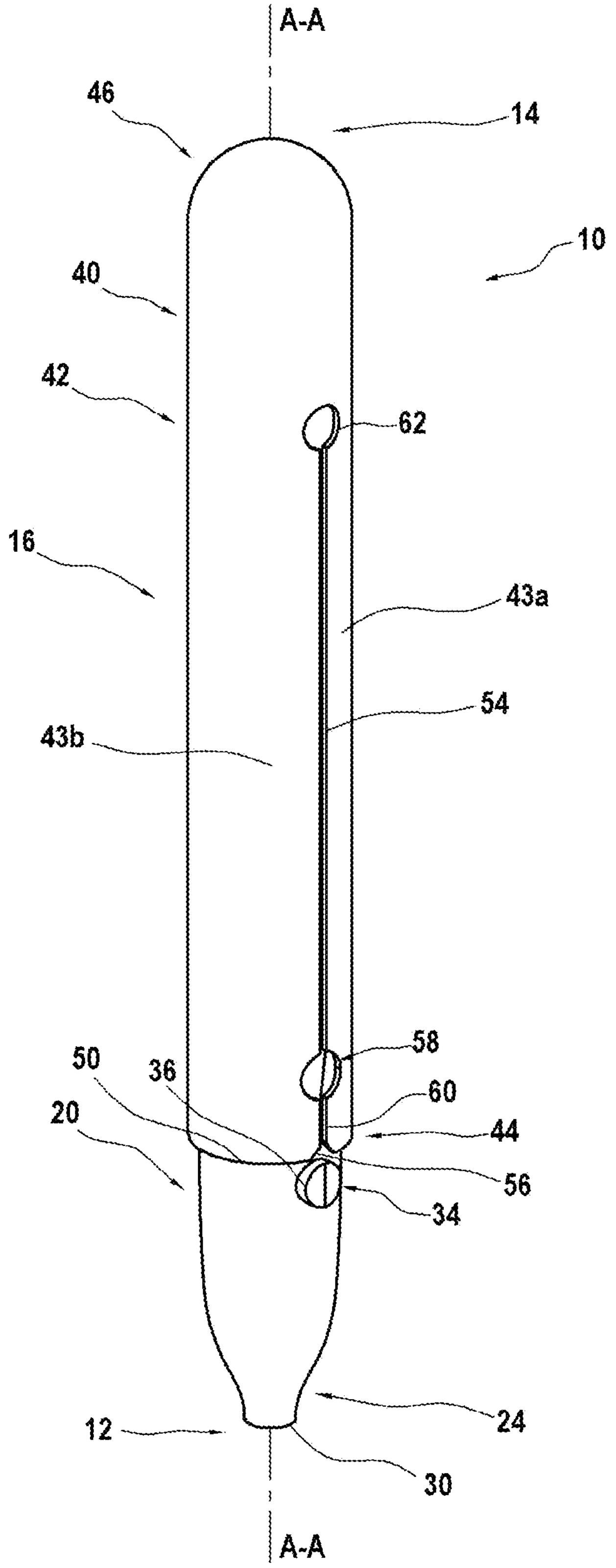

[Fig.3]
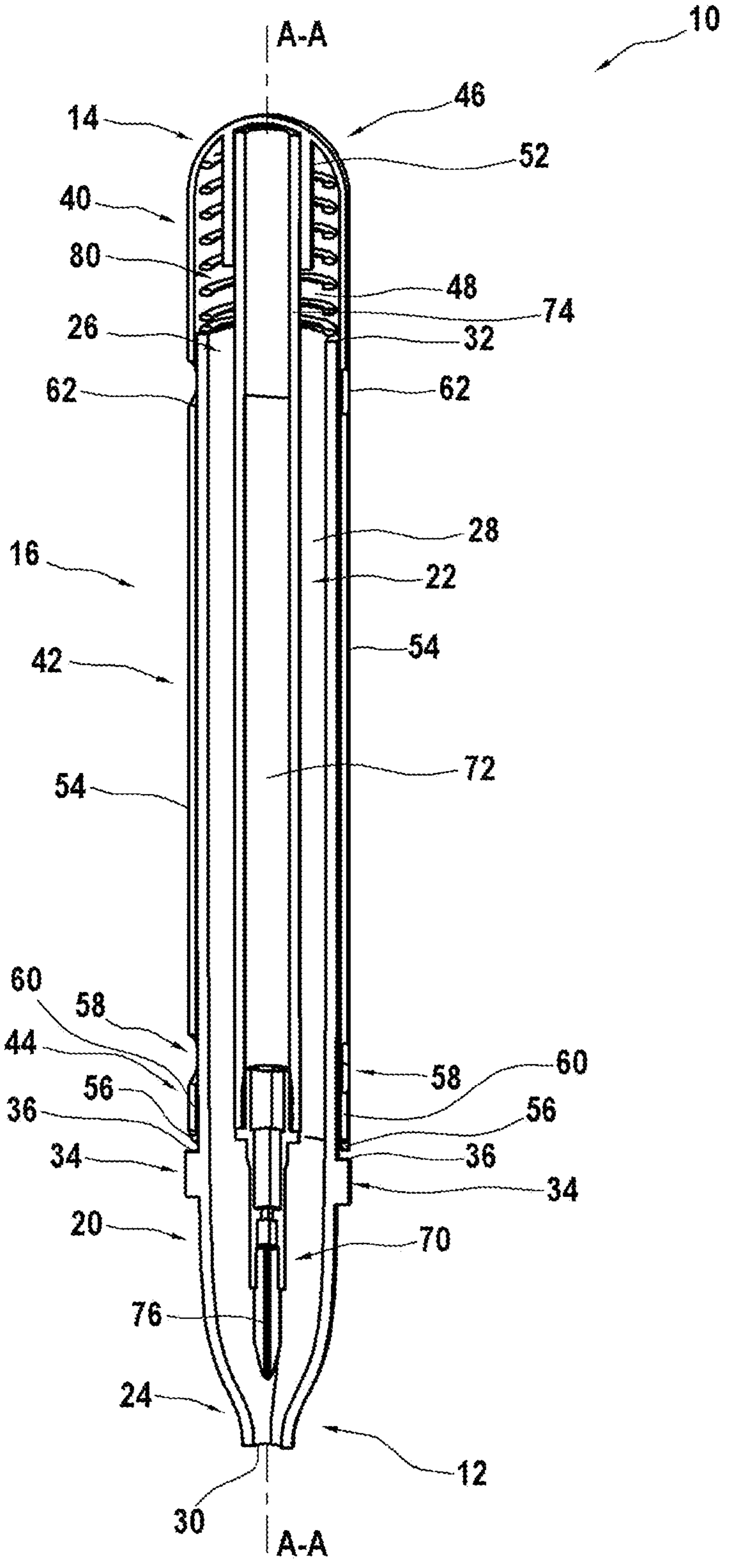

[Fig.4]
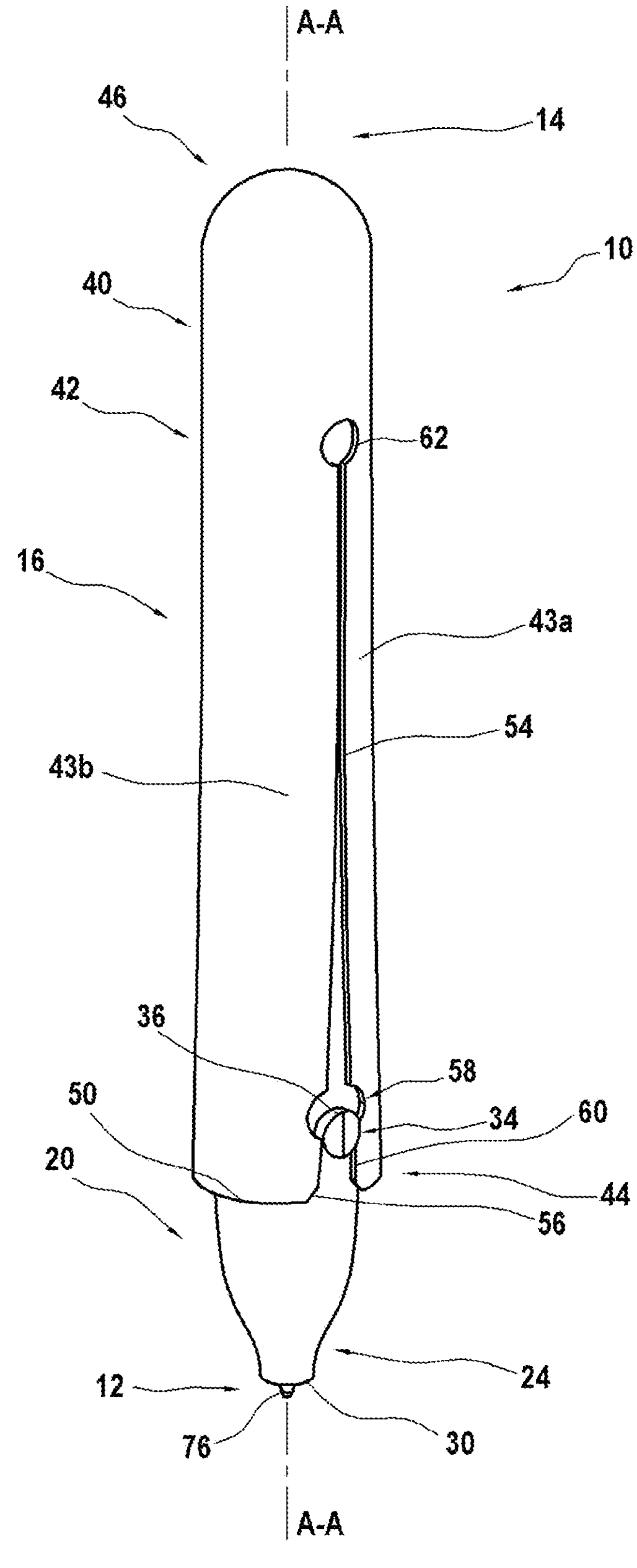

[Fig.5]
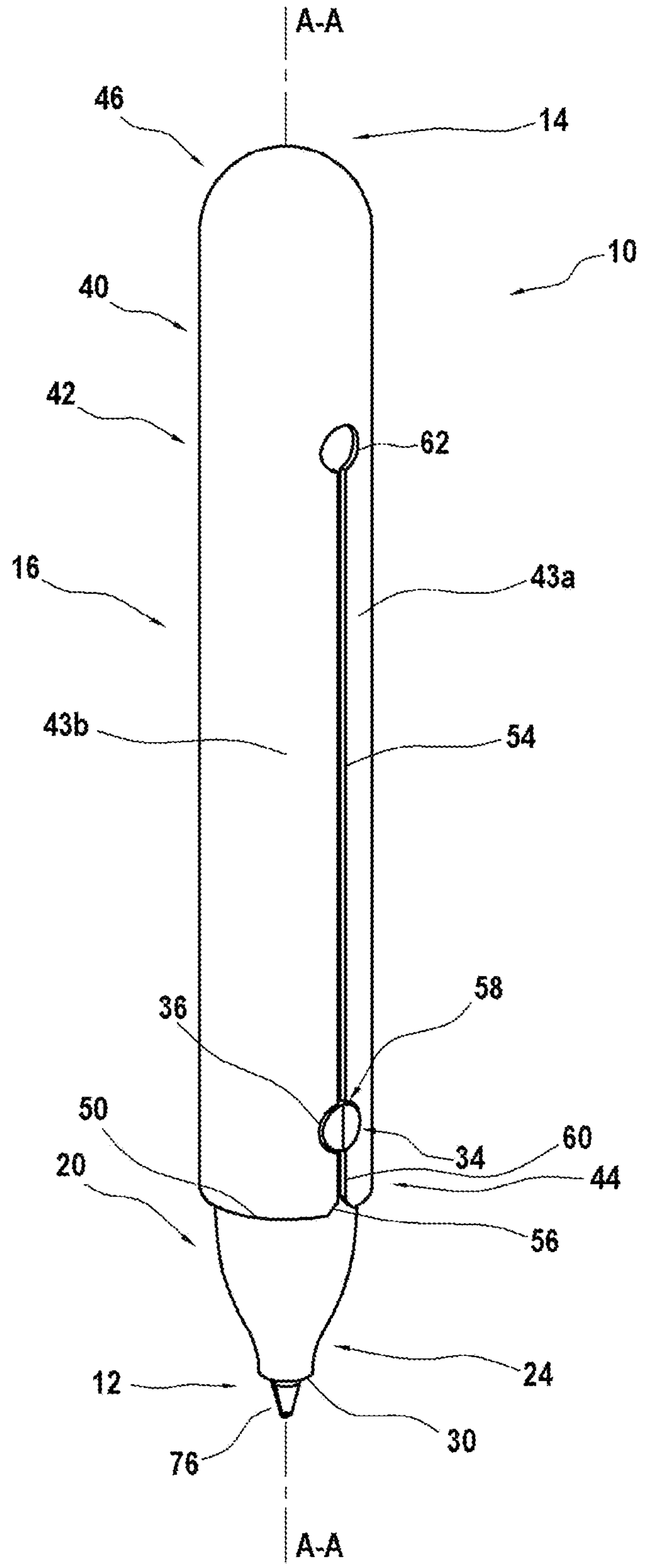

[Fig.6]
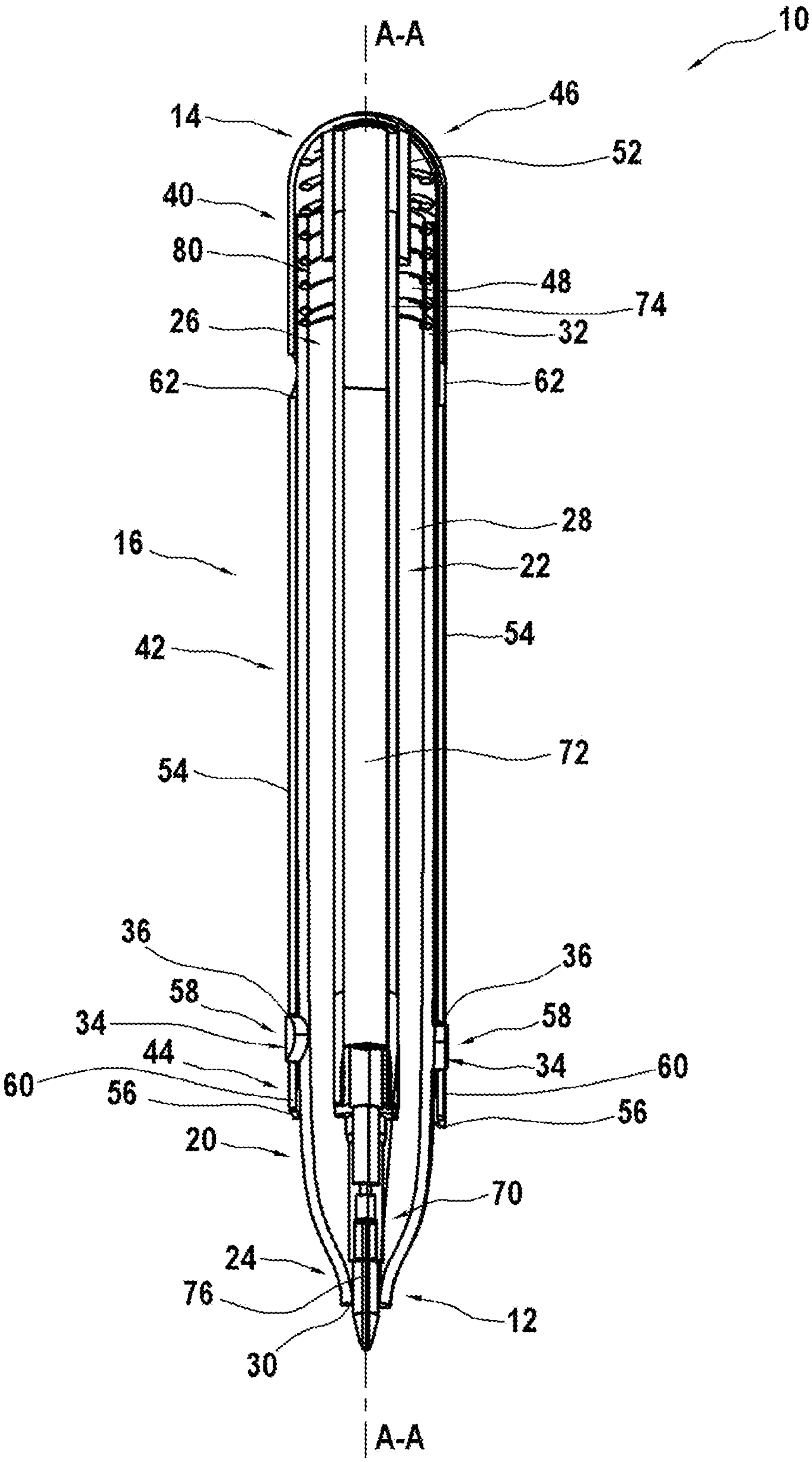

[Fig.7]
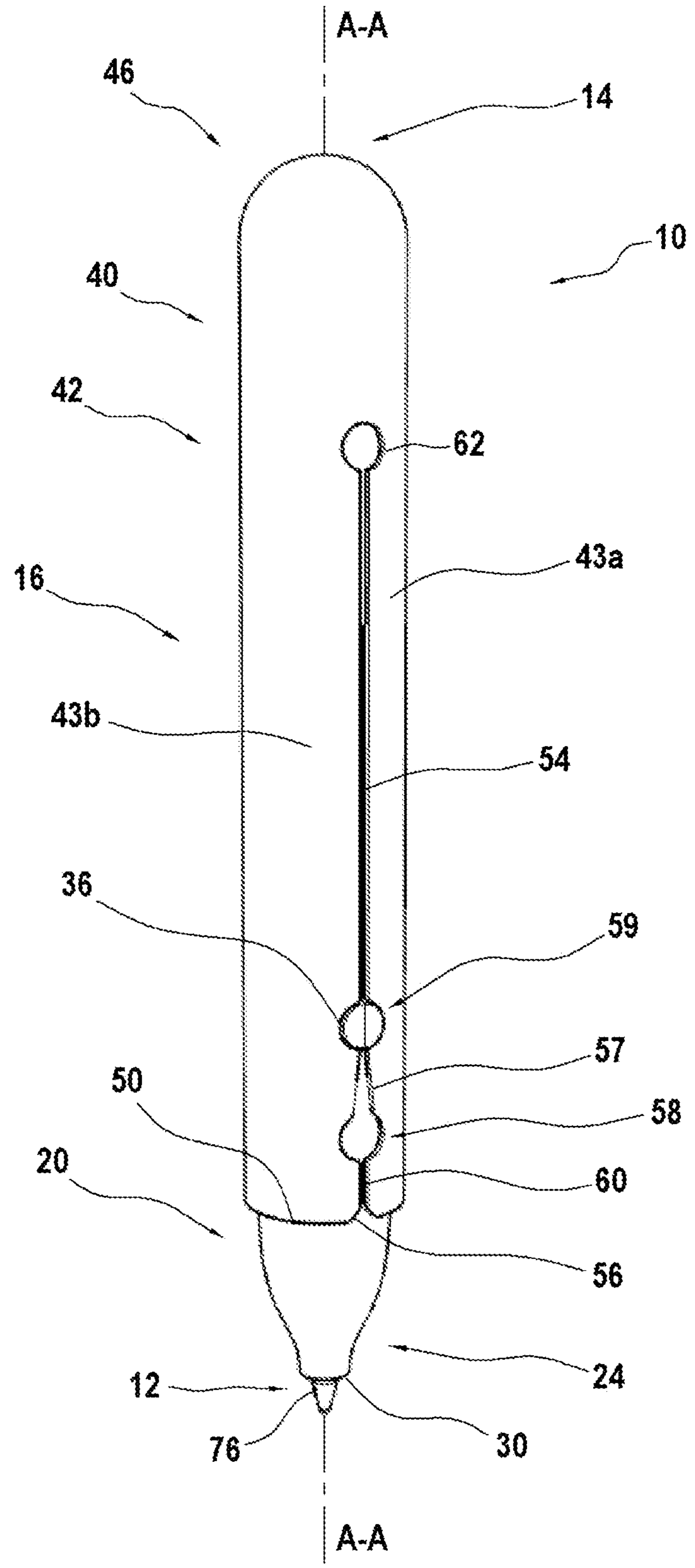

[Fig.8]
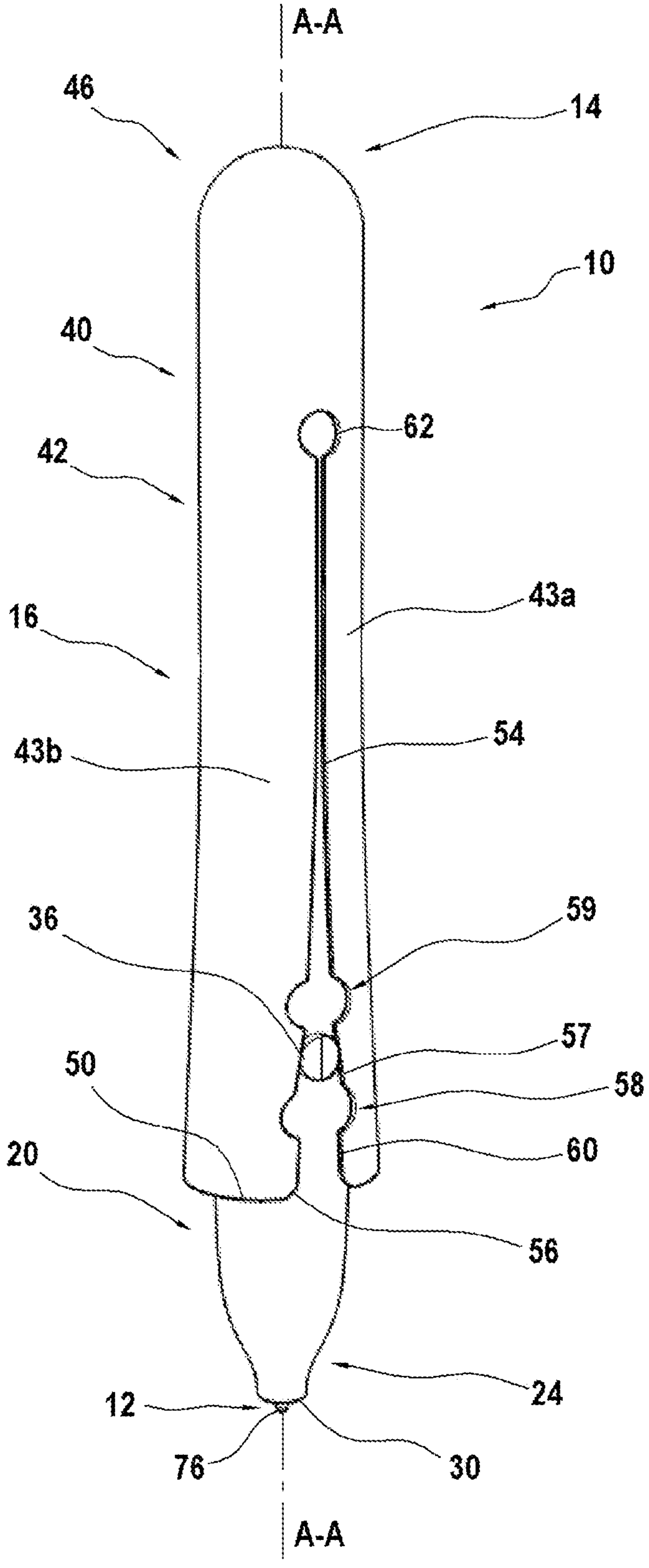

[Fig.9]
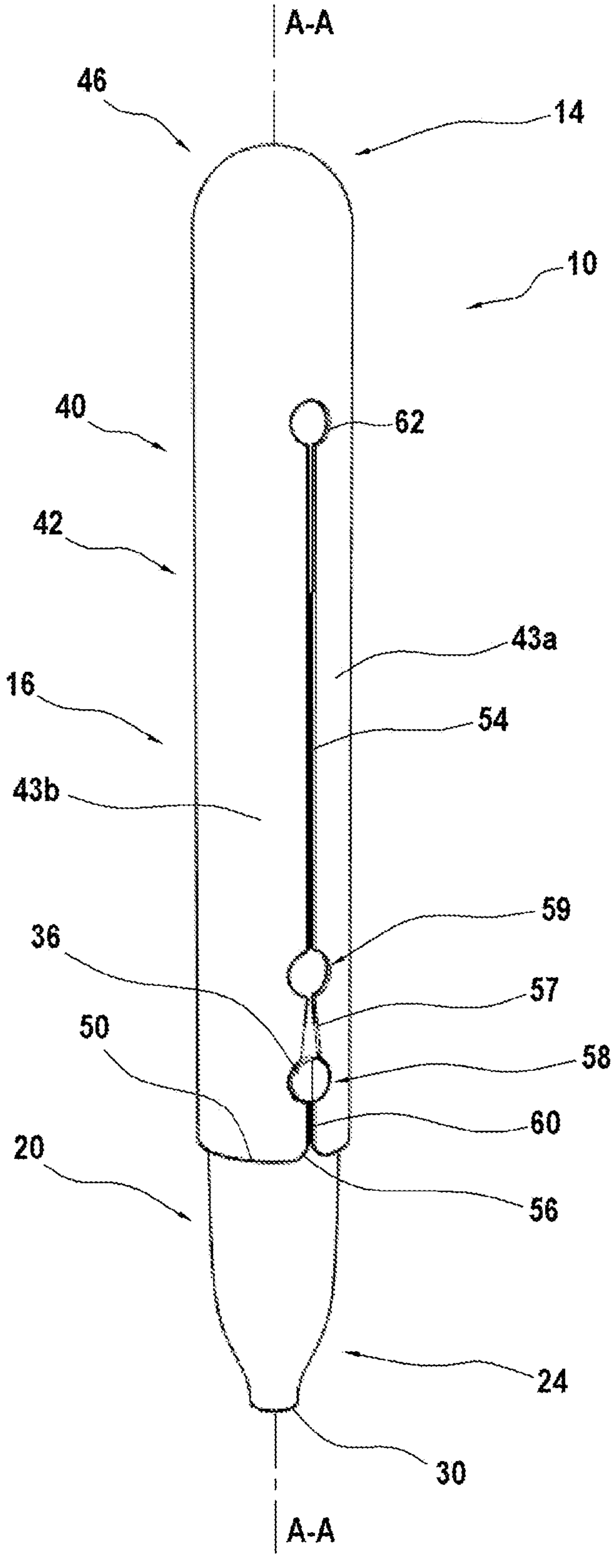

WRITING INSTRUMENT AND METHOD THEREOF

CROSS-REFERENCE TO RELATED APPLICATION

This patent application claims the benefit of priority to European Application No. 22163705.1, filed on Mar. 23, 2022, the entirety of which is incorporated herein by reference.

FIELD

The present disclosure relates to the field of writing instruments. More specifically, the present disclosure relates to a writing instrument configured to simplify functionality and improve ease of use.

BACKGROUND

A typical writing instrument may include one or more writing element disposed within a tubular housing. Examples of a writing element may include a ballpoint pen, a highlighter, a marker, a pencil, and/or the like. Additionally, the writing instrument may include a cap for protecting the writing element and/or a writing tip thereof, or the writing element may be mechanically displaceable, so that the writing element and/or the writing tip thereof may be moved to a position outside or inside the housing.

In traditional writing instruments that include a cap, the cap may be easily misplaced, which may cause drying of the writing element and/or the writing tip thereof and, thus, a loss of functionality of the writing instrument.

Further, in traditional writing instruments that include a mechanically displaceable writing element, the traditional writing instruments typically require several complex components and/or relationships, which results in increased modes of failure and/or increased complexity and cost of manufacture. Additionally, in traditional writing instruments that include a mechanically displaceable writing element, the traditional writing instruments typically require a user to manually and/or actively displace the writing element out of and into the housing, by way of a button, pusher element, and/or the like. Manual and/or active displacement of the writing element by the user requires increased thought, dexterity, and the use of fine motor skills (e.g. being able to isolate and/or move fingers of the hand independent of a palm of the hand) on the part of the user. As such, use of such a traditional writing instrument may be particularly difficult or frustrating for a toddler, a person having certain disabilities, a person wearing gloves, a person simultaneously holding an additional object, and/or the like.

It is desirable to provide a writing instrument that includes structures and/or relationships configured to automatically displace a writing element of the writing instrument, so as to avoid usage of a cap and automatically protect the writing element and/or the writing tip thereof during non-use of the writing instrument, thereby simplifying functionality and improving ease of use of the writing instrument.

SUMMARY

According to aspects of the disclosure, a writing instrument extending along an axis between a first end and a second end is provided. The writing instrument includes a writing element configured to produce writing upon a surface, a first housing member extending axially between the first end and the second end of the writing instrument and oriented radially about at least a portion of the writing element, and a second housing member extending axially between the first end and the second end of the writing instrument and oriented radially about at least a portion of the first housing member, the second housing member being configured to move relative to the first housing member, axially between a first relative position and a second relative position, and at least a portion of the second housing member being configured to move radially with respect to the first housing member, wherein the relative movement of the second housing member from the first relative position toward the second relative position transitions the writing instrument from a non-writing state toward a writing state and the relative movement of the second housing member from the second relative position toward the first relative position automatically transitions the writing instrument from the writing state toward the non-writing state.

According to aspects of the disclosure, the second housing member may include a body having a first body element and the first body element is configured to elastically deform to transition the writing instrument between the non-writing state and the writing state.

According to aspects of the disclosure, the body may extend axially between a first end and a second end of the second housing member and the body may define a pair of opposing slits extending axially between the first end and the second end of the second housing member.

According to aspects of the disclosure, each slit may interrupt the first end of the second housing member.

According to aspects of the disclosure, each slit may extend to a ramped edge at the first end of the second housing member.

According to aspects of the disclosure, the second housing member may be configured to support the writing element.

According to aspects of the disclosure, the writing element may be enclosed within the first housing member when the second housing member is in the first relative position and at least a portion of the writing element may extend out of the first housing member when the second housing member is in the second relative position.

According to aspects of the disclosure, the first housing member may include an engagement member and the second housing member may include a complimentary engagement member, and the engagement member of the first housing member and the complimentary engagement member of the second housing member may be configured to engage each other when the second housing member is in the second relative position.

According to aspects of the disclosure, at least one of the slits of the pair of opposing slits of the second housing member may be configured to receive the engagement member of the first housing member.

According to aspects of the disclosure, the engagement member of the first housing member may include a curved engagement surface.

According to aspects of the disclosure, the engagement member of the first housing member may be in the form of a boss extending radially from the first housing member.

According to aspects of the disclosure, the complimentary engagement member of the second housing member may be in the form of a clearance defined by the second housing member.

According to aspects of the disclosure, the complimentary engagement member of the second housing member may be bisected by a corresponding slit of the pair of opposing slits.

According to aspects of the disclosure, the writing instrument may be configured to automatically transition from the writing state to the non-writing state upon a removal of force exerted on the second housing member.

According to aspects of the disclosure, the second housing member may be biased toward the first relative position by a bias member.

According to aspects of the disclosure, the bias member may be positioned between the first housing member and the second housing member.

According to aspects of the disclosure, a method of operating a writing instrument is provided. The method includes providing the writing instrument according to any aspect disclosed herein, exerting a force upon the second housing member of the writing instrument to transition the writing instrument to the writing state and removing the force from the second housing member of the writing instrument to transition the writing instrument to the non-writing state.

In the manner described and according to aspects illustrated herein, the writing instrument and the method are capable of automatically displacing the writing element of the writing instrument, so as to simplify functionality and improve ease of use of the writing instrument.

BRIEF DESCRIPTION OF THE DRAWINGS

Aspects of an embodiment will be described in reference to the drawings, where like numerals reflect like elements:

FIG. 1 is a side exploded view of a writing instrument according to aspects of the disclosure;

FIG. 2 is a side perspective view of the writing instrument according to FIG. 1, showing the writing instrument in a non-writing state according to aspects of the disclosure;

FIG. 3 is a side cross-sectional view of the writing instrument according to FIG. 2;

FIG. 4 is a side perspective view of the writing instrument according to FIG. 1, showing the writing instrument between the non-writing state and a writing state according to aspects of the disclosure;

FIG. 5 is a side perspective view of the writing instrument according to FIG. 1, showing the writing instrument in the writing state according to aspects of the disclosure;

FIG. 6 is a side cross-sectional view of the writing instrument according to FIG. 5;

FIG. 7 is a side perspective view of an alternative arrangement of the writing instrument according to FIG. 1, showing the writing instrument in the writing state;

FIG. 8 is a side perspective view of the writing instrument according to FIG. 7, showing the writing instrument between the writing state and the non-writing state; and FIG. 9 is a side perspective view of the writing instrument according to FIG. 7, showing the writing instrument in the non-writing state.

DETAILED DESCRIPTION

An embodiment of a writing instrument and a method according to aspects of the disclosure will now be described with reference to FIGS. 1-9. Like numerals represent like parts, and the writing instrument will generally be referred to by the reference numeral 10. Although the writing instrument 10 is described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above"

the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

As shown in FIGS. 1-3, a writing instrument 10 configured to simplify functionality and/or improve ease of use is provided. The term "writing instrument" as used herein may be understood to be a tool used to produce writing (e.g. figures, characters, lines, forms, and/or the like). In the disclosed embodiment, the writing instrument 10 extends from a first end 12 to a second end 14 along an axis A-A. The writing instrument 10 includes a housing 16 having a first housing member 20 extending axially between the first end 12 and the second end 14 of the writing instrument 10 and a second housing member 40 extending axially between the first end 12 and the second end 14 of the writing instrument 10. In examples, the housing 16 includes a tubular shape; however, it is contemplated that other shapes may be compatible with the writing instrument 10. The writing instrument 10 also includes a writing element 70 configured to produce writing upon a surface and a bias member 80 configured to mechanically displace the writing element 70 to retract the writing element 70 within the housing 16.

In this manner, by including the first housing member 20 and the second housing member 40 of the housing 16, the writing element 70, and the bias member 80 according to aspects of the disclosure herein, the writing element 70 and, thus, the writing instrument 10, is configured to transition between a non-writing state (see FIGS. 2-3 and 9) and a writing state (see FIGS. 5-7). Accordingly, transition of the writing element 70 and/or the writing instrument 10 between the non-writing state and the writing state may be referred to herein interchangeably. In the non-writing state, the writing element 70 is incapable of producing writing upon the writing surface. In the writing state, the writing element 70 is capable of producing writing upon the writing surface. Further, by including the first housing member 20 and the second housing member 40 of the housing 16, the writing element 70, and the bias member 80 according to aspects of the disclosure herein, the writing element 70 and, thus, the writing instrument 10, is configured to transition from the writing state to the non-writing state automatically, in a manner that simplifies functionality and improves ease of use of the writing instrument 10. It is contemplated that the term "automatically" as used herein may be understood as not requiring input and/or further input from a user.

The first housing member 20, the second housing member 40, the writing element 70, and the bias member 80 are all configured to extend along the axis A-A of the writing instrument 10. As such, it is contemplated that the first housing member 20, the second housing member 40, the writing element 70, and the bias member 80 of the writing instrument 10 each include an axis which is common to and/or the same as the axis A-A of the writing instrument 10. As such, the axis of each of the first housing member 20, the second housing member 40, the writing element 70, and the bias member 80 of the writing instrument 10 will also be referred to herein as "the axis A-A."

The term "writing element" may be understood to be a component of the writing instrument 10 configured to contain and transfer a fluid-based writing medium (not shown), such as ink, to a writing surface (not shown) (e.g. a highlighter, ballpoint pen, rollerball pen, fountain pen, marker, felt-tipped pen, and/or the like). Additionally or alternatively, the term "writing element" may be understood to be a component of the writing instrument 10 configured to contain and transfer a solid-type writing medium (not shown) or electronic-type writing medium to the writing surface (e.g. a pencil, chalk, charcoal, lead, active stylus, and/or the like).

In examples, the writing element 70 may be a highlighter. It is contemplated that the term "highlighter" as used herein may be understood to be a writing element 70 configured to overlay brightly colored transparent ink to mark select text on the writing surface. Referring to FIGS. 1, 3, and 6, as a highlighter, the writing element 70 includes a filler-type writing medium cartridge (also may be referred to herein as a "reservoir") 72, which is a writing medium cartridge 72 that is manufactured from a porous material (not shown) for holding the writing medium, such as within the pores of the writing medium cartridge 72, without allowing the writing medium to flow freely, yet allowing the writing medium to be extracted, such as by a wick using capillary forces, for application to the writing surface. To this end, the writing element 70 may include a casing 74 that surrounds the writing medium cartridge 72. The casing 72 of the writing element 70 may be directly supported by the housing 16 of the writing instrument 10. Accordingly, the casing 74 may be manufactured from a rigid material capable of mating with the housing 16 and/or providing structural integrity to the writing medium cartridge 72.

The writing element 70 also includes a writing tip (also may referred to herein as a "nib") 76 configured to transfer the writing medium from the writing medium cartridge 72 to the writing surface. The writing tip 76 may be constructed of the same or substantially similar porous material as the writing medium cartridge 72. Due to the porosity of at least the writing medium cartridge 72 and the writing tip 76 of the writing element 70, in combination with direct exposure to areas that surround the writing element 70, prolonged exposure to an environment external to the writing instrument 10 (hereafter, "the external environment") may cause desiccation and/or drying of at least the writing medium cartridge 72 and the writing tip 76 of the writing element 70. It is contemplated that an environment external to the writing instrument 10 may be any area and/or surrounding environment external to and/or outside of the housing 16 of the writing instrument 10. Accordingly, enclosure of the writing element 70 within the housing 16 of the writing instrument 10 during non-use of the writing instrument 10 (i.e. the non-writing state) protects the writing element 70 from desiccation. To this end and as will be discussed, the writing instrument 10 is configured for automatic retraction of the writing element 70 into the housing 16 of the writing instrument 10 (i.e. automatic transition of the writing instrument 10 from the writing state to the non-writing state).

As shown in FIGS. 1-3, the housing 16 of the writing instrument 10 includes the first housing member 20 and the second housing member 40. The first housing member 20 is configured to mate with the second housing member 40 to form the housing 16 of the writing instrument 10. In the disclosed embodiment, the first housing member 20 is received within the second housing member 40. Additionally, the first housing member 20 extends within the second housing member 40, between the first end 12 and the second end 14 of the writing instrument 10. To this end, the first housing member 20 has a first diameter, the second housing member 40 has a second diameter, and the first diameter of the first housing member 20 is less than the second diameter of the second housing member 40. At least a portion of the first housing member 20 (a first end 24 of the first housing member 20—discussed further below) may protrude out of the second housing member 40. The first housing member 20 may be interference fit within the second housing member 40. However, the second housing member 40 is capable of relative movement about the first housing member 20 (see FIGS. 2 and 4-5). In this manner, the first housing member 20 and the second housing member 40 form the housing 16 of the writing instrument 10.

Referring to FIGS. 1 and 3, the first housing member 20 includes a body 22 extending axially between a first end 24 and a second end 26 of the first housing member 20. The body 22 of the first housing member 20 extends between the first end 24 and the second end 26 between the first end 12 and the second end 14 of the writing instrument 10. The first housing member 20 is configured to be oriented radially about at least a portion of the writing element 70. It is contemplated that the term "radially" as used herein may be understood as a component, surface, position, region, direction, and/or the like that extends and/or moves substantially toward or away from the axis A-A. To this end, the body of the first housing member 20 defines a (first) cavity 28 extending axially between the first end 24 and the second end 26 of the first housing member 20. The first housing member 20 is configured to allow the writing element 70 to extend out of and retract into the housing 16 of the writing instrument 10. To this end, the body 22 of the first housing member 20 defines a first opening 30 at the first end 24 of the first housing member 20. The first opening 30 of the first housing member 20 is configured to allow the writing element 70 to extend out of and retract into the housing 16 of the writing instrument 10. In particular, the first opening 30 of the first housing member 20 is configured to allow the writing tip 76 of the writing element 70 to extend out of and retract into the housing 16 of the writing instrument 10. Additionally, the body 22 of the first housing member 20 defines a second opening 32 at the second end 26 of the first housing member 20 configured to receive at least a portion of the writing element 70 and at least a portion of the second housing member 40 (a support 52—discussed further below). In this manner, the first housing member 20 is configured to receive and/or surround at least the writing medium cartridge 72 and the writing tip 76 of the writing element 70. The cavity 28 of the first housing member 20 extends between and is in communication with the first opening 30 and the second opening 32 of the first housing member 20. In this manner, surrounding at least the writing medium cartridge 72 and the writing tip 76 of the writing element 70, the first housing member 20 is configured to protect the writing element 70 from the external environment when the writing instrument 10 is in the non-writing state.

Referring to FIGS. 1-3, the first housing member 20 is configured to engage the second housing member 40. To this end, the first housing member 20 includes a first engagement member 34 configured to engage one or more complimentary engagement member (a second engagement member 58 and/or a third engagement member 59—discussed further below) included by the second housing member 40. The first engagement member 34 of the first housing member 20 may be in the form of at least one boss extending radially from the body 22 of the first housing member 20. In examples, the first engagement member 34 may be in the form of a pair of opposing bosses extending radially from the body 22 of the first housing member 20. Each of the bosses and, thus, the first engagement member 34 includes an engagement surface 36 configured to come into contact with the complimentary engagement member 58, 59 of the second housing member 40. In examples, the engagement surface 36 of the first engagement member 34 may include a curved surface configured to come into contact with the complimentary engagement member 58, 59 of the second housing member 40. The engagement surface 36 of the first engagement member 34 including a curved surface allows complimentary engagement surfaces (a ramped edge 56 and an engagement surface 60—discussed further below) of the second housing member 40 to slide upon the engagement surface 36 of the first engagement member 34, thereby allowing for a smooth, unencumbered engagement of the first engagement member 34 with the complimentary engagement member 58, 59 of the second housing member 40 and/or improved ease of use of the writing instrument 10. To this end, in examples, each boss of the first engagement member 34 may include a cylindrical shape.

In examples, the first engagement member 34 of the first housing member 20 is positioned adjacent the first end 24 of the first housing member 20. As such, the first engagement member 34 may only engage the complimentary engagement member 58, 59 of the second housing member 40 once a biasing force exerted by the bias member 80, which is positioned at the second end 26 of the first housing member 20, is overcome by a force exerted on the second housing member 40. In examples, the bias member 80 is a coil spring; however, it is contemplated that other bias members may be compatible with the writing instrument 10. Referring to FIGS. 3 and 6, the second end 26 of the first housing member 20 is configured to support the bias member 80 between the first housing member 20 and the second housing member 40. In this manner, overcoming the biasing force of the bias member 80 allows the complimentary engagement member 58, 59 of the second housing member 40 to move toward and/or engage the first engagement member 34 of the first housing member 20.

As shown in FIGS. 1-3, the second housing member 40 includes a body 42 extending between a first end 44 and a second end 46 of the second housing member 40. The body 42 of the second housing member 40 extends between the first end 44 and the second end 46 between the first end 12 and the second end 14 of the writing instrument 10. Further, the first end 44 and second end 46 of the body 42 of the second housing member 40 correspond to and/or are adjacent to the first end 24 and the second end 26 of the body 22 of the first housing member 20, respectively. Further, the second housing member 40 is configured to be oriented radially about at least a portion of the writing element 70. Additionally, the second housing member 40 is configured to be oriented radially about at least a portion of the first housing member 20. To this end, the body 42 of the second housing member 40 defines a (second) cavity 48 extending axially between the first end 44 and the second end 46 of the second housing member 40. At least a portion of the first housing member 20 and at least a portion of the writing element 70 are received within the cavity 48 of the second housing member 40. Further, the first housing member 20 and the writing element 70 each extend axially within the cavity 48 of the second housing member 40, between the first end 44 and the second end 46 of the second housing member 40. In examples, at least a portion of the first housing member 20 and at least a portion of the writing element 70 protrude out of the first end 44 of the second housing member 40. In particular, the first end 24 of the first housing member 20 and the writing tip 76 of the writing element 70 protrude out of the first end 44 of the second housing member 40. To this end, the body 42 of the second housing member 40 defines an opening 50 at the first end 44 configured to allow the first housing member 20 and the writing element 70 to protrude out of the first end 44 of the second housing member 40. In this manner, the writing tip 76 of the writing element 70 is capable of extending out of and retracting into the housing 16 of the writing instrument 10.

As shown in FIGS. 3 and 6, the body 42 of the second housing member 40 includes a support 52 at the second end 46 of the second housing member 40 configured to receive and/or support the writing element 70 within the writing instrument 10. The support 52 of the second housing member 40 may be in the form of a cylindrical column defining a space for receiving at least a portion of the writing element 70. In particular, the support 52 of the second housing member 40 defines a space for receiving a butt end of the casing 74 of the writing element 70 opposite the writing tip 76. In examples, the support 52 of the second housing member 40 extends axially from the second end 46 of the second housing member 40 toward the first end 44 of the second housing member 40. In particular, the support 52 of the second housing member 40 extends towards the second opening 32 at the second end 26 of the first housing member 20. In this manner, the writing element 70, supported by the support 52 of the second housing member 40, extends axially from the second end 46 of the second housing member 40, through the second opening 32 of the first housing member 20, and into the cavity 28 of the first housing member 20. Accordingly, the writing element 70 is protected within the first housing member 20 when the writing instrument 10 is in the non-writing state, and capable of moving axially through the first housing member 20, relative to the first housing member 20, due to axial movement of the second housing member 40 relative to and/or about the first housing member 20.

As illustrated by FIGS. 2-9, the second housing member 40 is configured for relative movement with respect to the first housing member 20. It is contemplated that the term "relative movement" as used herein may be understood as a change in position of the second housing member 40 with respect to the first housing member 20 and/or a change in position of the first housing member 20 with respect to the second housing member 40. In examples, the second housing member 40 is configured to move axially between a first relative position (see FIGS. 2-3 and 9) and a second relative position (See FIGS. 5-7) with respect to the first housing member 20. In particular, the second housing member 40 is configured to move relative to the first housing member 20, axially between the first relative position and the second relative position. In the first relative position of the second housing member 40, the writing tip 76 is retracted within the first housing member 20 and, thus, the writing instrument 10 is in the non-writing state. In the second relative position of the second housing member 40, the writing tip 76 of the writing element 70 extends out of the first opening 30 at the first end 24 of the first housing member 20 and, thus, the writing instrument 10 is in the writing state. In examples, the second housing member 40 is configured to move from the second relative position toward the first relative position, with respect to the first housing member 20, due to removal of force exerted on the second housing member 40 by the user. In this manner, the writing instrument 10 is configured to transition from the writing state to the non-writing state automatically.

In examples, the second housing member 40 moves relative to the first housing member 20 in a first relative direction toward the second relative position and in a second relative direction toward the first relative position. To this end, the second housing member 40 is configured to move relative to the first housing member 20, in the first relative direction about the first housing member 20, toward the first end 24 of the first housing member 20 toward the second relative position and in the second relative direction about the first housing member 20 away from the first end 24 of the first housing member 20 toward the first relative position. As such, an axial distance between the first end 24 of the first housing member 20 and the first end 44 of the second housing member 40 in the first relative position is greater than an axial distance between the first end 24 of the first housing member 20 and the first end 44 of the second housing member 40 in the second relative position. Additionally, the second housing member 40 is biased toward the first relative position by the bias member 80. To this end, the bias member 80 is positioned between and supported by the second end 26 of the first housing member 20 and the second end 46 of the second housing member 40, supported by the body 22 of the first housing member 20 at the second end 46 of the first housing member 20 and the body 42 of the second housing member 40 at the second end 46 of the second housing member 40. Additionally, at least a portion of the support 52 of the second housing member 40 and at least a portion of the writing element 70 are configured to extend and/or move axially through the bias member 80. In this manner, force exerted on the second end 46 of the second housing member 40 causes compression of the bias member 80, thereby allowing for axial relative movement of the second housing member 40 in the first relative direction from the first relative position toward the second relative position and, thus, axial relative movement of the writing element 70 within the first housing member 20 in the first relative direction of the second housing member 40. Therefore, the first body element 43*a* and/or the second body element 43*b* are configured to elastically deform to transition the writing instrument 10 between the writing state and the non-writing state.

As illustrated in FIGS. 2 and 4-5, the second housing member 40 is configured to move radially to allow for relative movement of the second housing member 40 between the first relative position and the second relative position. In particular, the second housing member 40 being configured to move radially to allow for relative movement of the second housing member 40 between the first relative position and the second relative position may include the second housing member 40 being configured to elastically deform and/or flex radially to disengage and engage the first housing member 20. To this end, the body 42 of the second housing member 40 is manufactured from a material capable of being elastically deformed, such as plastic. Further, to this end, the body 42 of the second housing member 40 includes a pair of opposing slits 54 extending axially between the first end 44 and the second end 46 of the second housing member 40. In particular, each slit 54 of the pair of opposing slits 54 may extend from the first end 44 of the second housing member 40 to a location between the first end 44 and the second end 46 of the second housing member 40. To this end, each slit 54 of the pair of opposing slits 54 interrupts and/or divides the first end 44 of the second housing member 40. Each slit 54 of the pair of opposing slits 54 separates and/or divides the body 42 of the second housing member 40 into a first body element 43*a* and a second body element 43*b* of the body 42 of the second housing member 40. The first body element 43*a* and the second body element 43*b* are thus capable of moving radially away and toward each other, thereby allowing for radial movement to disengage and engage the first housing member 20, so that the second housing member 40 may move relative to the first housing member 20 between the first relative position and the second relative position and, thus, transition the writing instrument 10 between the writing state and the non-writing state.

Referring to FIG. 4, each slit 54 of the pair of opposing slits 54 is configured to receive the first engagement member 34 of the first housing member 20. To this end, each slit 54 of the pair of opposing slits 54 includes an engagement surface 60 complimentary to the engagement surface 36 of the first engagement member 34 of the first housing member 20. Additionally, at the location in which each slit 54 of the pair of opposing slits 54 interrupts the first end 44 of the second housing member 40, each slit 54 extends to a ramped and/or chamfered edge (surface) 56 configured to come into contact with and receive the first engagement member 34 of the first housing member 20. Additionally or alternatively, each slit 54 of the pair of opposing slits 54 may extend to a pair of ramped and/or chamfered edges (surfaces) 56. The ramped edge 56 allows the second housing member 40 to slide upon the first engagement member 34 and/or the engagement surface 46 of the first engagement member 34 so that the first engagement member 34 may be received between the slits 54, thereby pushing the first body element 43*a* and the second body element 43*b* of the body 42 of the second housing member 40 apart and causing the second housing member 40 to move radially to disengage and engage the first engagement member 34 of the first housing member 20 so that the second housing member 40 may move relative to the first housing member 20 between the first relative position and the second relative position and, thus, transition the writing instrument 10 between the writing state and the non-writing state.

As shown in FIGS. 2-9, the second housing member 40 includes at least a second engagement member 58 complimentary to the first engagement member 34 of the first housing member 20. In particular, in an alternative arrangement shown in FIGS. 7-9, the second housing member 40 may include the second engagement member 58 and a third engagement member 59 complimentary to the first engagement member 34 of the first housing member 20. The second engagement member 58 and the third engagement member 59 of the second housing member 40 may each be in the form of a clearance (also may be referred to herein as a "hole"). In particular, the second engagement member 58 and the third engagement member 59 of the second housing member 40 may each be in the form of a pair of opposing clearances; however, the pair of opposing clearances of the second engagement member 58 and the third engagement member 59 will be referred to herein as "the clearance" unless reference to the pair of opposing clearances is otherwise necessary. Referring to FIGS. 4-9, each of the second engagement member 58 and the third engagement member 59 of the second housing member 40 is configured to receive a corresponding boss of the first engagement member 34 of the first housing member 20. Further, each of the second engagement member 58 and the third engagement member 59 are bisected by the pair of opposing slits 54 of the second housing member 40. As such, the engagement surface 60 of each slit 54 extends into the second engagement member 58 and the third engagement member 59. Additionally, a width of the clearance of each of the second engagement member 58 and the third engagement member 59 is wider than the pair of opposing slits 54. Accordingly, each slit 54 of the second housing member 40 allows the body 42 (the first body element 43*a* and the second body element 43*b*) of the second housing member 40 to elastically deform radially outwardly, such that each of the second engagement member 58 and the third engagement member 59 are capable of receiving the first engagement member 34 of the first housing member 20 and/or having the first engagement member 34 removed from the second engagement member 58 and the third engagement member 59. Additionally, each slit 54 of the second housing member 40 allows the body 42 (i.e. the first body element 43*a* and the second body element 43*b*) of the second housing member 40 to elastically deform radially inwardly, such that each of the second engagement member 58 and the third engagement member 59 may be secured around the first engagement member 34. It is contemplated that the term "outwardly" may be understood as a direction away from the axis A-A and that the term "inwardly" may be understood as a direction toward the axis A-A.

Referring to FIGS. 7-9, the second engagement member 58 and the third engagement member 59 of the second housing member 40 are distanced from each other axially along the body 42 of the second housing member 40. In examples, the second engagement member 58 is closer to the first end 44 of the second housing member 40 than the third engagement member 59. Additionally, the third engagement member 59 is closer to the second end 46 of the second housing member 40 than the second engagement member 58.

Referring to FIGS. 2-6, in examples, the first engagement member 34 of the first housing member 20 is axially spaced from the second engagement member 58 of the second housing member 40 when the second housing member 40 is in the first relative position with respect to the first housing member 20 and the first engagement member 34 is secured within the second housing member 58 when the second housing member 40 is in the second relative position with respect to the first housing member 20. Alternatively, referring to FIGS. 7-9, the first engagement member 34 of the first housing member 20 is secured within the second engagement member 58 when the second housing member 40 is in the first relative position with respect to the first housing member 20 and the first engagement member 34 is secured within the third engagement member 59 when the second housing member 40 is in the second relative position with respect to the first housing member 20. Accordingly, due to relative movement of the second housing member 40 with respect to the first housing member 20, from the first relative position to the second relative position, the first engagement member 34 is disengaged from the second engagement member 58 and subsequently engaged with the third engagement member 59.

Within each slit 54, the engagement surface 60 may include a sloped portion 57 extending between the second engagement member 58 and the third engagement member 59. The sloped portion 57 allows the slit 54 to have a first width leading directly to the second engagement member 58 that is greater than a second width leading directly to the third engagement member 59. Accordingly, the slit 54 narrows gradually from the second engagement member 58 toward the third engagement member 59. In this manner, due to an increased width of the slit 54 at and/or adjacent the second engagement member 58, the user may easily and smoothly disengage the first engagement member 34 of the first housing member 20 to thereafter engage the first engagement member 34 with the third engagement member 59. Additionally, due to a decreased width of the slit 54 at and/or adjacent the third engagement member 59, the first engagement member 34 is less likely to slip out of engagement with the third engagement member 59 when the writing instrument 10 is in use in the writing state. Additionally, due to the increased width of the slit 54 at and/or adjacent the second engagement member 58, the writing instrument 10 may easily and smoothly automatically transition from the writing state toward the non-writing state when the writing instrument 10 is no longer in use (i.e. when the user does not apply force on any of the first body element 43*a* and/or the second body element 43*b* of the body 42 of the second housing member 40).

Additionally or alternatively, each of the slits 54 of the second housing member 40 may extend from a corresponding aperture 62. In examples, each aperture 62 has a width that is greater than a width of each slit 54. Further, each aperture 62 may be oriented adjacent the second end 46 of the second housing member 40. In this manner, each aperture 62 may function as a pivot point, allowing for greater elastic deformation of the second housing member 40 by way of the slits 54, so that the first body element 43*a* and the second body element 43*b* of the body 42 of the second housing member 40 are capable of more effective radial movement to transition the writing instrument 10 between the non-writing state and the writing state.

As illustrated by FIGS. 2, 4-5, and 7-9, in operation, relative movement of the second housing member 40 with respect to the first housing member 20, in the first relative direction from the first relative position toward the second relative position, causes the second housing member 40 (i.e. the first body element 43*a* and the second body element 43*b* of the body 42) to move radially to transition the writing instrument 10 from the non-writing state toward the writing state. For relative movement of the second housing member 40 with respect to the first housing member 20, in the first relative direction from the first relative position toward the second relative position, the user positions the first end 24 of the first housing member 20 upon the writing surface and exerts a force on the second housing member 40 in a direction corresponding to the first relative direction of the second housing member 40. It is contemplated that the writing surface applies a return force on the first end 24 of the first housing member 20 to allow the user to push the second housing member 40 in the first relative direction; however, any surface capable of applying a return force on the first end 24 of the writing instrument 10 may be used. Exertion of the force by the user on the second housing member 40 in the direction corresponding to the first relative direction of the second housing member 40 causes the second housing member 40 to overcome the biasing force of the bias member 80 to move relative to the first housing member 20 in the first relative direction of the second housing member 40.

Referring to FIGS. 2-6, in examples, as the second housing member 40 moves relative to the first housing member 20 in the first relative direction, the first end 44 of the second housing member 40 comes into contact with the first engagement member 34 of the first housing member 20. In particular, each interruption of the first end 44 of the first housing member 40 and, thus, each ramped edge 56 at the first end 44 of the first housing member 40 comes into contact with the engagement surface 36 of the first engagement member 34 of the first housing member 20. Referring to FIG. 4, as the ramped surface 56 slides upon the engagement surface 36 of the first engagement member 34, the body 42 of the second housing member 40 elastically deforms such that the first body element 43*a* and the second body element 43*b* are pushed apart via each slit 54. Each boss of the first engagement member 34 of the first housing member 20 is then received within a corresponding slit 54 of the second housing member 40. As the second housing member 40 continues to move in the first relative direction toward the second relative position due to continued exertion of force on the second housing member 40, the engagement surface 60 of the second housing member 40 within each slit 54 slides upon the engagement surface 36 of the first engagement member 34 until the second engagement member 58 of the second housing member 40 reaches the first engagement member 34 of the first housing member 20.

Alternatively, referring to FIGS. 7-9, as the second housing member 40 moves relative to the first housing member 20 in the first relative direction, the first engagement member 34 of the first housing member 20 disengages from the second engagement member 58 of the second housing member 40 and enters a portion of the slit 54 extending between the second engagement member 58 and the third engagement member 59 of the second housing member 20. Accordingly, the engagement surface 36 of the first engagement member 34 comes into contact with the engagement surface 60 within the slit 54 and extending between the second engagement member 58 and the third engagement member 59. The sloped portion 57 extending between the second engagement member 58 and the third engagement member 59 slides upon the engagement surface 36 of the first engagement member 34. The body 42 of the second housing member 40 elastically deforms such that the first body element 43*a* and the second body element 43*b* are pushed apart via each slit 54 until the third engagement member 59 reaches the first engagement member 34.

As shown by FIGS. 5-6, once the second engagement member 58 of the second housing member 40 reaches the first engagement member 34 of the first housing member 20, the second housing member 40 is in the second relative position. Additionally, once the second housing member 40 is in the second relative position and/or the second engagement member 58 of the second housing member 40 reaches the first engagement member 34 of the first housing member 20, the second engagement member 58 of the second housing member 40 receives and is secured around the first engagement member 34 of the first housing member 20, such that the first engagement member 34 protrudes through the second engagement member 58 and, thus, the body 42 of the second housing member 40, thereby transitioning the writing instrument from the non-writing state to the writing state.

Alternatively, referring to FIGS. 7-8, once the third engagement member 59 of the second housing member 40 reaches the first engagement member 34 of the first housing member 20, the second housing member 40 is in the second relative position. Additionally, once the second housing member 40 is in the second relative position and/or the third engagement member 59 of the second housing member 40 reaches the first engagement member 34 of the first housing member 20, the third engagement member 59 of the second housing member 40 receives and is secured around the first engagement member 34 of the first housing member 20, such that the first engagement member 34 protrudes through the third engagement member 59 and, thus, the body 42 of the second housing member 40, thereby transitioning the writing instrument from the non-writing state to the writing state.

Additionally, as shown in FIGS. 2-9, as the writing element 70 is supported by the support 52 of the second housing member 20, the writing element 70 is carried and/or moved relative to the first housing member 20 in the first relative direction of the second housing member 40 towards the first end 24 of the first housing member 20 by relative movement of the second housing member 40 with respect to the first housing member 20 in the first relative direction toward the second relative position. Accordingly, relative movement of the writing element 70 in the first relative direction of the second housing member 40 causes the writing tip 76 to extend out of the first opening 30 at the first end 24 of the first housing member 20. When the second housing member 40 is in the second relative position, the writing tip 76 fully extends out of the first opening 30 at the first end 24 of the first housing member 20 and is capable of producing writing upon the writing surface. Additionally, with the force exerted upon the body 42 of the second housing member 40 by the user to produce writing upon the writing surface, the second housing member 40 is maintained in the second relative position, such that the writing instrument 10 is maintained in the writing state. Additionally, with the second housing member 40 maintained in the second relative position, such that the writing instrument 10 is maintained in the writing state, extension of the writing tip 76 out of the first opening 30 at the first end 24 of the first housing member 20 is maintained.

Referring to FIGS. 4 and 8, once the force exerted upon the body 42 of the second housing member 40 is removed by the user, the bias member 80 automatically retracts the second housing member 40 and, thus, the writing element 70, in the second relative direction relative to the first housing member 20 from the second relative position of the second housing member 40 toward the first relative position of the second housing member 40. Referring to FIG. 4, relative movement of the second housing member 40 from the second relative position towards the first relative position causes the first engagement member 34 to no longer be received in and/or secured by the second engagement member 58, such that first engagement member 34 no longer protrudes through the second engagement member 58 and, thus, the body 42 of the second housing member 40, thereby automatically transitioning the writing instrument 10 from the writing state toward the non-writing state. Alternatively, referring to FIG. 8, relative movement of the second housing member 40 from the second relative position towards the first relative position causes the first engagement member 34 to no longer be received in and/or secured by the third engagement member 59, such that first engagement member 34 no longer protrudes through the third engagement member 59 and, thus, the body 42 of the second housing member 40, thereby automatically transitioning the writing instrument 10 from the writing state toward the non-writing state. Further, as the second housing member 40 continues to move relative to the first housing member 20 in the second relative direction toward the first relative position, the writing element 70 further retracts within the first housing member 20, such that writing tip 76 no longer extends out of the first opening 30 at the first end 24 of the first housing member 20. As shown in FIGS. 2-3 and 9, once the second housing member 40 reaches the first relative position, the writing tip 76 is fully retracted within the first housing member 20 and, thus, the housing 16 of the writing instrument 10.

In this manner, the writing instrument 10 is configured to automatically retract the writing element 70 within the housing 16 of the writing instrument 10, by merely removing force exerted on the housing 16 of the writing instrument 10, so as to avoid usage of a cap and to automatically protect the writing element 70 and/or the writing tip 76 thereof during non-use of the writing instrument, thus simplifying functionality and improving ease of use of the writing instrument 10.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

The invention claimed is:

1. A writing instrument extending along an axis between a first end and a second end, the writing instrument comprising:

a writing element configured to produce writing upon a surface;

a first housing member extending axially between the first end and the second end of the writing instrument and oriented radially about at least a portion of the writing element; and a second housing member extending axially between the first end and the second end of the writing instrument and oriented radially about at least a portion of the first housing member, the second housing member being configured to move relative to the first housing member, axially between a first relative position and a second relative position, and at least a portion of the second housing member being configured to move radially to with respect to the first housing member;

wherein, the relative movement of the second housing member from the first relative position toward the second relative position transitions the writing instrument from a non-writing state toward a writing state and the relative movement of the second housing member from the second relative position toward the first relative position automatically transitions the writing instrument from the writing state toward the non-writing state, wherein the writing instrument is configured to automatically transition from the writing state to the non-writing state upon a removal of force exerted on the second housing member.

2. The writing instrument of claim 1, wherein the second housing member comprises a body having a first body element and the first body element is configured to elastically deform to transition the writing instrument between the non-writing state and the writing state.

3. The writing instrument of claim 2, wherein body extends axially between a first end and a second end of the second housing member and the body defines a pair of opposing slits extending axially between the first end and the second end of the second housing member.

4. The writing instrument of claim 3, wherein each slit of the pair of opposing slits interrupts the first end of the second housing member.

5. The writing instrument of claim 3, wherein each slit of the pair of opposing slits extends to a ramped edge at the first end of the second housing member.

6. The writing instrument of claim 1, wherein the second housing member is configured to support the writing element.

7. The writing instrument of claim 1, wherein the writing element is enclosed within the first housing member when the second housing member is in the first relative position and at least a portion of the writing element extends out of the first housing member when the second housing member is in the second relative position.

8. The writing instrument of claim 1, wherein the first housing member includes an engagement member and the second housing member includes a complimentary engagement member, and the engagement member of the first housing member and the complimentary engagement member of the second housing member are configured to engage each other when the second housing member is in the second relative position.

9. The writing instrument of claim 8, wherein the body extends axially between a first end and a second end of the second housing member and the body defines a pair of opposing slits extending axially between the first end and the second end of the second housing member, and at least one of the slits of the pair of opposing slits of the second housing member is configured to receive the engagement member of the first housing member.

10. The writing instrument of claim 8, wherein the engagement member of the first housing member includes a curved engagement surface.

11. The writing instrument of claim 8, wherein the engagement member of the first housing member is in the form of a boss extending radially from the first housing member.

12. The writing instrument of claim 8, wherein the complimentary engagement member of the second housing member is in the form of clearance defined by the second housing member.

13. The writing instrument of claim 8, wherein the body extends axially between a first end and a second end of the second housing member and the body defines a pair of opposing slits extending axially between the first end and the second end of the second housing member, and the complimentary engagement member of the second housing member is bisected by a corresponding slit of the pair of opposing slits.

14. The writing instrument of claim 1, wherein the second housing member is biased toward the first relative position by a bias member.

15. The writing instrument of claim 14, wherein the bias member is positioned between the first housing member and the second housing member.

16. The writing instrument of claim 14, wherein the bias member is configured to mechanically displace the writing element so as to retract the writing element within the housing.

17. The writing instrument of claim 14, wherein the first housing member, the second housing member, the writing element, and the bias member are all configured to extend along the axis of the writing instrument.

18. Method of operating a writing instrument, wherein the method includes providing the writing instrument of claim 1, exerting a force upon the second housing member of the writing instrument to transition the writing instrument to the writing state and removing the force from the second housing member of the writing instrument to transition the writing instrument to the non-writing state.

* * * * *